Patented May 16, 1933

1,908,773

UNITED STATES PATENT OFFICE

GEORGE LUTZ, OF ROCKY RIVER, OHIO, ASSIGNOR TO THE GRASSELLI CHEMICAL COMPANY, OF CLEVELAND, OHIO, A CORPORATION OF DELAWARE

SULPHURIZED CINCHONA BARK ALKALOID

No Drawing. Original application filed December 16, 1931, Serial No. 581,518. Divided and this application filed April 23, 1932. Serial No. 607,226.

This invention relates to processes of cleaning and pickling metal articles by the action of acids thereon, and is particularly directed to the use in cleaning and pickling baths of certain organic substances which I have found to have the property of inhibiting the action of acids upon the metal itself, without in any substantial manner hindering its action on the oxide, rust and scale or other undesirable incrustations which such operations are intended to remove from the metal.

I have found that sulphur or substances which release sulphur on heating in contact with nitrogenous organic substances will react with cinchona bark alkaloids to form new substances which, in the absence of a more thorough understanding of the chemical reactions involved, I shall designate as sulphurized cinchona bark alkaloids. Typical representatives of the cinchona bark alkaloids which react with sulphur are quinine, quinidine, cinchonine and particularly quinoidine, the by-product of the extraction of the medicinal alkaloids from the cinchona bark.

I further found that these novel, sulphurized alkaloids act as inhibitors in cleaning operations involving the action of non-oxidizing acids upon metal articles.

My invention comprises these novel sulphurized cinchona bark alkaloids and their application to the control of the action of acids upon metals.

My novel sulphurized compounds are prepared by heating the alkaloids with elemental sulphur, sulphur chloride or other substances which release sulphur on heating, either direct or in the presence of a catalyst, such as aluminum chloride.

A preferred process for preparing sulphurized quinoidine or sulphurized cinchona bark alkaloids is as follows:

The quinoidine or cinchona bark alkaloid is first melted in any suitable receptacle until fluid. A definite amount of powdered sulphur is then stirred into the molten mass with continued heating until a sudden rise in temperature is noted, at which point the heating is discontinued. The sudden rise in temperature is accompanied by vigorous reaction with copious evolution of $H_2S$ and the mass is stirred constantly to prevent excess foaming. The sudden rise in temperature brings the temperature up to 135° C.–140° C., and the mass is kept at this temperature for at least 15 minutes before cooling.

The amount of sulphur used in preparing these sulphurized compounds may vary from 5 to 20% by weight, although in my preferred process I use about 15% by weight.

These sulphurized compounds may also be prepared by heating quinoidine or the cinchona bark alkaloids with sulphur chloride instead of powdered sulphur, either direct or in the presence of a common solvent.

The substances obtained by these sulphurization processes are substantially the same in properties. They vary in the amount of sulphur combined according to the amount of sulphur or sulphurization reagent used, and are probably mixtures of various sulphurized products and contain anywhere from 5 to 15% S.

They are yellowish to reddish-brown, brittle masses which are easily ground to powder.

They have no definitely known chemical composition, though from analogy with the sulphurization of aromatic amines, it can be assumed that the sulphur enters by replacement of hydrogen into the nuclei of the alkaloids.

These sulphurized alkaloids have no definite melting point, they melt between about 135 to 200° C., that is to say, higher than the raw materials.

They are insoluble in aqueous caustic alkalis and difficultly soluble in the common organic solvents, except in chloroform.

They are almost completely soluble in dilute mineral acids, seemingly without decomposition, even on boiling.

The main use I found for these novel substances is in metal cleaning operations.

The use of cinchona bark alkaloids as inhibitors is disclosed in U. S. Patent No. 1,742,986, January 7, 1930, H. P. Corson, Inhibitor. I have found that my novel sulphurized cinchona bark alkaloids present certain advantages over the original alkaloids in metal cleaning operations in that the new derivatives are easier soluble in the cleaning acid solution and have a higher pickling efficiency.

Pickling and metal cleaning operations involve commonly the use of dilute, non-oxidizing acids, such as sulphuric, hydrochloric, acetic, formic, aqueous solutions of acid sulphates, etc., and such baths are used for numerous purposes, of which pickling in steel mills is the most typical representative. The composition, concentration, temperature and other factors vary with different baths, but the underlying principle comprises in all cases the removal of undesirable incrustations by the action of the acid. The bare metal so obtained is then in the absence of an inhibitor unavoidably subjected to attack by the acid with unnecessary loss of metal, weakening of the article and unnecessary consumption of acid.

My novel inhibitors, comprising sulphurized quinoidine and other sulphurized cinchona bark alkaloids are efficient inhibitors with the various commonly used pickling and cleaning acids. The application of my invention to acid pickling and acid metal cleaning operations does not involve any change in the baths and operation thereof, except for the addition of a small amount of these inhibitors. Less than ½ of 1% of sulphurized quinoidine added to an acid pickling or cleaning bath will, to a large extent, if not entirely, prevent the attack of the base metal under the conditions where all undesirable incrustations are removed. In some instances amounts of .1% or less are efficient and sufficient for all purposes.

In pickling operations the concentration of acid in the pickling bath varies from 5 to 10%, and the temperature from 140 to 190° F. Laboratory tests by the so-called loss in weight method which consists of a beaker-scale pickling operation using a 6% sulphuric acid pickling bath, at 180° F., noting the loss in weight of the steel after one-half hour, and after two one-hour periods of immersion after the first half hour immersion in the bath, showed my novel inhibitors to have the following inhibiting efficiencies when the sulphurized products are compounded at the rate of 10% with 90% inert ingredients:

| Concentration of compounded inhibitor | | .05 percent | | | .1 percent | | |
|---|---|---|---|---|---|---|---|
| Period of pickling | | 1 | 2 | 3 | 1 | 2 | 3 |
| Time of pickling (minutes) | | 30 | 60 | 60 | 30 | 60 | 60 |
| Scale included | | Yes | No | No | Yes | No | No |
| Active ingredient composition | | | | | | | |
| Quinoidine, percent | Reacted with sulphur, percent | | | | | | |
| 85 | 15 | 72.5 | 92.4 | 82.6 | 76.2 | 97.7 | 97.5 |
| 80 | 20 | 64.9 | 90.4 | 80.2 | 77.4 | 98.0 | 98.0 |
| 85 | 15% sulphur chloride | 77.6 | 88.9 | 77.3 | 79.1 | 97.7 | 97.3 |
| 100 | None | 82.9 | 34.6 | | 88.9 | 44.6 | |
| Cinchonine alkaloid, percent | Reacted with sulphur, percent | | | | | | |
| 90 | 10 | 81.7 | 78.2 | 63.5 | 81.6 | 97.04 | 96.1 |
| 100 | None | 40.6 | | | 61.9 | 42.9 | |

In the above table the efficiency for the first period includes the loss in weight due to adhering scale and other incrustations, which varies on the different specimens of steel. In the second and third periods the loss is due to loss of bare metal only.

Four inhibited acids were prepared by dissolving sulfurized quinoidine in cold 18° Bé. commercial muriatic acid at the rate of 1%, .5%, .1% and .02%.

Portions of these acids were then diluted to 15% acidity as HCl and the inhibiting efficiency was determined on 26 gauge black sheet steel at 80–90° F.

The first period of pickling consisted of 5 hours during which the scale was removed, and the second period of pickling consisted of 16 hours after the first 5 hours. The loss in weight of the steel was noted for each period and calculated to per cent inhibiting efficiency.

*Results obtained*

[Inhibiting efficiency of 18° Bé. Commercial muriatic acid containing 1%, .5%, .1% and .02% sulphurized quinoidine diluted to 15% acidity at 80–90° F. on 26 gauge black sheet steel.]

| Concentration of sulphurized quinoidine in 18 degree Bé. HCl | 1st period of pickling 5 hours scale included | 2nd period of pickling 16 hours after first 5 hours. No scale | 21 hours pickling includes scale |
|---|---|---|---|
| Percent | | | |
| 1.0 | 64.8 | 99.2 | 94.8 |
| .5 | 70.8 | 99.3 | 95.7 |
| .1 | 73.6 | 98.8 | 96.3 |
| .02 | 66.4 | 98.3 | 94.3 |

Similar efficiency figures were obtained with quinine and quinidine sulphurized with 5, 10, 15 or 20% sulphur without or with, for instance 2% aluminum chloride.

This is a division of my application Ser. No. 581,518, filed December 16, 1931.

I claim:

1. An organic compound containing nitrogen and sulphur, a yellowish to reddish brown, resinous substance having no sharp melting point, which is insoluble in aqueous caustic alkali but soluble at least to a large extent in dilute mineral acid and has the property of inhibiting the action of acids upon metals, said compound being sulphurized quinoidine.

2. An organic compound containing nitrogen and from about 5 to 15% sulphur, a reddish brown, resinous substance melting above about 135° C., which is insoluble in aqueous caustic alkali, soluble in chloroform and nearly entirely soluble in dilute mineral acid, and has the property of inhibiting the action of acids upon metals, said compound being sulphurized quinoidine obtained by heating quinoidine for 15 to 20 minutes at about 135 to 140° C. with from about 5 to 20% of its weight of sulphur.

In testimony whereof, I affix my signature.

GEORGE LUTZ.